(12) United States Patent
Fiallos et al.

(10) Patent No.: US 9,312,994 B2
(45) Date of Patent: Apr. 12, 2016

(54) DOWNLINK PHYSICAL LAYER PROCESSING IN WIRELESS NETWORKS WITH SYMBOL RATE MAPPING

(71) Applicant: Telefonaktiebolaget L M Ericsson (publ), Stockholm (SE)

(72) Inventors: Edgard Fiallos, Ottawa (CA); Christien Leblanc, Ottawa (CA); Johan Eker, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 184 days.

(21) Appl. No.: 14/041,601

(22) Filed: Sep. 30, 2013

(65) Prior Publication Data

US 2015/0092671 A1   Apr. 2, 2015

(51) Int. Cl.
  *H04L 5/00* (2006.01)
  *H04L 27/26* (2006.01)
(52) U.S. Cl.
  CPC .............. *H04L 5/003* (2013.01); *H04L 5/0044* (2013.01); *H04L 5/0078* (2013.01); *H04L 27/2601* (2013.01)
(58) Field of Classification Search
  CPC ..................................................... H04L 5/0078
  USPC ......................................................... 370/329
  See application file for complete search history.

(56) References Cited

U.S. PATENT DOCUMENTS

| 7,746,917 | B2 | 6/2010 | Horneman et al. | |
| 2002/0129314 | A1* | 9/2002 | Kim et al. | 714/755 |
| 2008/0080444 | A1 | 4/2008 | Fisher-Jeffes et al. | |
| 2009/0232050 | A1 | 9/2009 | Shen et al. | |
| 2012/0263246 | A1 | 10/2012 | Gazit et al. | |

FOREIGN PATENT DOCUMENTS

| EP | 1755233 | * | 4/2003 |
| EP | 1 755 233 A2 | | 2/2007 |
| GB | 2 454 865 A | | 5/2009 |

OTHER PUBLICATIONS

Dhalman, Erik et al., "4G LTE/LTE—Advanced for Mobile Broadband", 4G LTE/LTE—Advanced for Mobile Broadband, Chapter 10, Mar. 29, 2011, 145-202.*

(Continued)

*Primary Examiner* — Ian N Moore
*Assistant Examiner* — Mewale Ambaye
(74) *Attorney, Agent, or Firm* — Myers Bigel & Sibley, P.A.

(57) ABSTRACT

A downlink physical layer processing system includes a transport block segmentation processor that receives a transport block and generates segmented blocks from the transport block, an encoder that encodes the segmented blocks and forms encoded blocks, a mapping processor that maps the encoded blocks to symbols corresponding to resource elements to generate mapped symbols for transmission over a transmission medium, and a transmission signal generator that processes the mapped symbols to generate transmission signals for transmission over the transmission medium. The mapping processor maps the encoded blocks to the symbols in response to a control signal generated by the transmission signal generator. The encoder thereby operates in response to timing of data received by the encoder while the mapping processor operates in response to timing of processing of symbols by the transmission signal generator.

14 Claims, 6 Drawing Sheets

(56) References Cited

OTHER PUBLICATIONS

3GPP TS 36.211 V8.5.0 (Dec. 2008); $3^{rd}$ Generation Partnership Project "Technical Specification Group Radio Access Network; Evolved Universal Terrestrial Radio Access (E-UTRA); Physical Channels and Modulation", (Release 8); 82 pages.

3GPP TS 36.212 V8.5.0 (Dec. 2008); $3^{rd}$ Generation Partnership Project "Technical Specification Group Radio Access Network; Evolved Universal Terrestrial Radio Access (E-UTRA); Multiplexing and channel coding", (Release 8); 58 pages.

PCT International Search Report and Written Opinion corresponding to PCT/IB2014/001861, mailed Jan. 16, 2015 (10 pages).

* cited by examiner

DOWNLINK PHYSICAL LAYER PROCESSING IN WIRELESS NETWORKS WITH SYMBOL RATE MAPPING

FIELD

The present invention relates to wireless communication networks, and in particular, the present invention relates to communication networks in which resources are aggregated in downlink transmissions.

BACKGROUND

In a typical cellular radio system, wireless terminals (also known as mobile stations and/or user equipment units (UEs)) communicate via a radio access network (RAN) to one or more core networks. User equipment units (UEs) may be, for example, mobile telephones ("cellular" telephones), desktop computers, laptop computers, tablet computers, and/or any other devices with wireless communication capability to communicate voice and/or data with a radio access network.

The radio access network covers a geographical area which is divided into cell areas, with each cell area being served by a base station, e.g., a radio base station (RBS), which in some networks is also called "NodeB" or (in Long Term Evolution) an eNodeB. A cell is a geographical area where radio coverage is provided by the radio base station equipment at a base station site. Each cell is identified by an identity within the local radio area, which is broadcast in the cell. The base stations communicate over the air interface operating on radio frequencies with the UEs within range of the base stations.

In some versions (particularly earlier versions) of the radio access network, several base stations are typically connected (e.g., by landlines or microwave) to a radio network controller (RNC). The radio network controller, also sometimes termed a base station controller (BSC), supervises and coordinates various activities of the plural base stations connected thereto. The radio network controllers are typically connected to one or more core networks, typically through a gateway.

Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) access technology. The Universal Terrestrial Radio Access Network (UTRAN) is essentially a radio access network using wideband code division multiple access for user equipment units (UEs). The Third Generation Partnership Project (3 GPP) has undertaken to evolve further the UTRAN and GSM based radio access network technologies.

Specifications for Evolved Universal Terrestrial Radio Access Network (E-UTRAN) are ongoing within the 3rd Generation Partnership Project (3 GPP). Another name used for E-UTRAN is the Long Term Evolution (LTE) Radio Access Network (RAN). Long Term Evolution (LTE) is a variant of a 3GPP radio access technology wherein the radio base station nodes are connected directly to a core network rather than to radio network controller (RNC) nodes. In general, in LTE the functions of a radio network controller node are performed by the radio base stations nodes. As such, the radio access network of an LTE system has an essentially "flat" architecture comprising radio base station nodes without reporting to radio network controller nodes.

The evolved UTRAN comprises evolved base station nodes, e.g., evolved NodeBs or eNBs, providing user-plane and control-plane protocol terminations toward the UEs. The eNB hosts the following functions (among other functions not listed): (1) functions for radio resource management (e.g., radio bearer control, radio admission control), connection mobility control, dynamic resource allocation (scheduling); (2) mobility management entity (MME) including, e.g., distribution of paging message to the eNBs; and (3) User Plane Entity (UPE), including IP Header Compression and encryption of user data streams; termination of U-plane packets for paging reasons, and switching of U-plane for support of UE mobility. The eNB hosts the PHYsical (PHY), Medium Access Control (MAC), Radio Link Control (RLC), and Packet Data Control Protocol (PDCP) layers that include the functionality of user-plane header-compression and encryption. The eNodeB also offers Radio Resource Control (RRC) functionality corresponding to the control plane. The eNodeB performs many functions including radio resource management, admission control, scheduling, enforcement of negotiated UL QoS, cell information broadcast, ciphering/deciphering of user and control plane data, and compression/decompression of DL/UL user plane packet headers.

The LTE standard is based on multi-carrier based radio access schemes such as Orthogonal Frequency-Division Multiplexing (OFDM) in the downlink and SC-FDMA in the uplink. Orthogonal FDM's (OFDM) spread spectrum technique distributes the data over a large number of carriers that are spaced apart at precise frequencies. This spacing provides the "orthogonality" in this technique which reduces interference. The benefits of OFDM are high spectral efficiency, resiliency to RF interference, and lower multi-path distortion.

As noted above, in the E-UTRAN Radio Access Network scheme, the management of radio resource such as time, frequency and spatial resources takes place in the individual base stations (or cells). Each eNodeB base station therefore includes a Radio Resource Management (RRM) unit for performing management of radio resources. These RRM units typically operate independently from each other, except for very limited exchange of information, such as traffic load condition.

FIG. 1 schematically illustrates a conventional wireless network 10. Referring to FIG. 1, in a conventional wireless network 10, a base station 12 communicates with a core network 18 through a gateway 16. Communications between the base station 12 and the gateway 16 are carried over a transport network 20, which may include wired and/or wireless communication links. The base station 12 also communicates with one or more user equipment units (UEs) 14 through a radio access network (RAN 30). Signals, such as voice and/or data signals, transmitted by the UE 14 are carried over the RAN 30 to the base station 12, and then over the transport network 20 to the gateway 16, for transmission to the core network 18.

Transmissions from the UEs 14 to the base station 12 are referred to as "uplink" transmissions, while transmissions from the base station 12 to the UEs 14 are referred to as "downlink" transmissions. In downlink transmissions, data for multiple UEs are aggregated by the base station 12 into a transmission time interval (TTI), which translates into twelve or fourteen OFDM symbols for more efficient bandwidth usage. The hardware and software in the base station 12 that handle the actual physical transmission of data over the air interface is referred to as the physical (PHY), or L1 layer, of the base station. The L1 layer transmits transport blocks provided by the transport, or L2 layer.

SUMMARY

A downlink physical layer processing system according to some embodiments includes a transport block segmentation processor configured to receive a transport block and to generate segmented blocks from the transport block, an encoder configured to encode the segmented blocks to form encoded blocks, a mapping processor configured to map the encoded blocks to symbols corresponding to resource elements to generate mapped symbols for transmission over a transmission medium, and a transmission signal generator configured to process the mapped symbols to generate transmission signals for transmission over the transmission medium. The mapping processor is configured to map the encoded blocks to the symbols in response to a control signal generated by the transmission signal generator.

A downlink physical layer processing system according to some embodiments may utilize symbol rate processing in portions of Layer 1 (L1) processing of downlink data to reduce latency and/or reduce memory requirements in the system.

The transmission signal generator includes an inverse fast fourier transform processor and wherein the transmission symbols include orthogonal frequency division multiplexing symbols.

The downlink physical layer processing system may further include a symbol buffer configured to store a predetermined number of symbols. The mapping processor may be configured to store the mapped symbols in the symbol buffer, and the transmission signal generator may be configured to read the mapped symbols from the symbol buffer.

The symbol buffer may include a circular buffer. The circular buffer may be sized to hold three symbols.

The transmission signal generator may be configured to generate the control signal in response to processing a symbol stored in the symbol buffer.

The mapping processor may operate independently of timing of processing of segmented blocks by the encoder.

A downlink physical layer processing system according to further embodiments includes an encoder configured to generate encoded blocks from transport blocks, a mapping processor configured to map the encoded blocks to symbols for transmission over a transmission medium, and a transmission signal generator configured to process the symbols to generate transmission signals for transmission over the transmission medium. The encoder operates in response to timing of transmission time interval data received by the encoder and the mapping processor operates in response to timing of processing of symbols by the transmission signal generator.

A method of operating a downlink physical layer processing system according to some embodiments includes receiving a transport block, generating segmented blocks from the transport block, encoding the segmented blocks to form encoded blocks, mapping the encoded blocks to symbols corresponding to resource elements to generate mapped symbols for transmission over a transmission medium, and processing the mapped symbols to generate transmission signals for transmission over the transmission medium. Mapping the encoded blocks to the symbols is performed in response to generation of the transmission signals.

Processing the mapped symbols to generate transmission signals for transmission may include performing an inverse fast fourier transform on the mapped symbols to generate orthogonal frequency division multiplexing signals.

The method may further include storing a predetermined number of mapped symbols in a symbol buffer, and reading the mapped symbols from the symbol buffer prior to processing the mapped symbols to generate transmission signals for transmission.

BRIEF DESCRIPTION OF THE DRAWINGS

The accompanying drawings, which are included to provide a further understanding of the invention and are incorporated in and constitute a part of this application, illustrate certain embodiment(s) of the invention. In the drawings.

DETAILED DESCRIPTION OF EMBODIMENTS

Embodiments of the present invention utilize symbol rate processing in portions of Layer 1 (L1) processing of downlink data to reduce latency and/or reduce memory requirements in a downlink L1 processor.

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

The primary function of the downlink physical layer in a wireless communication network is to convert a binary stream of transport blocks provided by Layer 2 (the Transport Layer) into a waveform of OFDM symbols for transmission over an air interface. The resulting waveform may contain information destined for multiple UEs.

Figure 1:
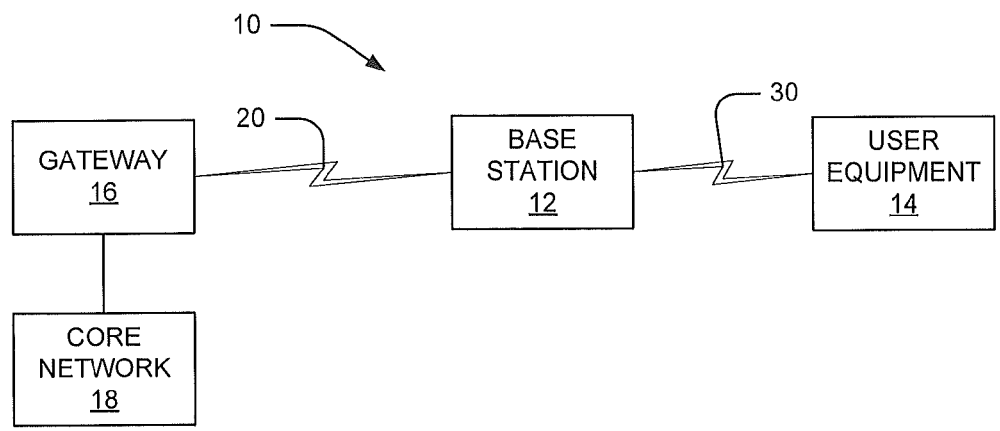
FIG. 1 is a schematic illustration of a conventional wireless network.
Figure 2:
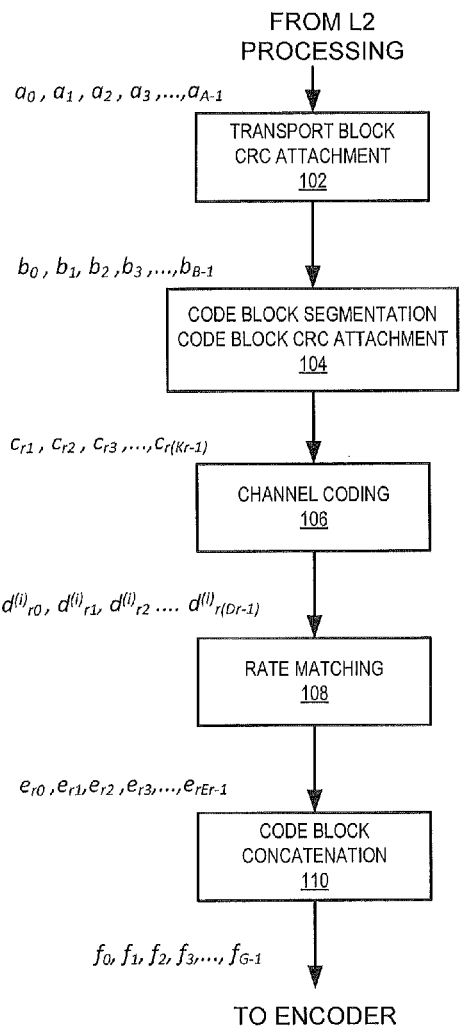
FIGS. 2-3 are block diagrams illustrating operational elements of a downlink processing system in a base station.
Figure 3:
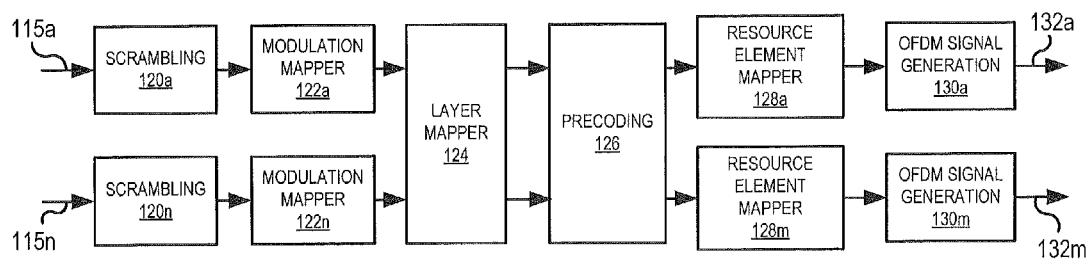
Figure 4:
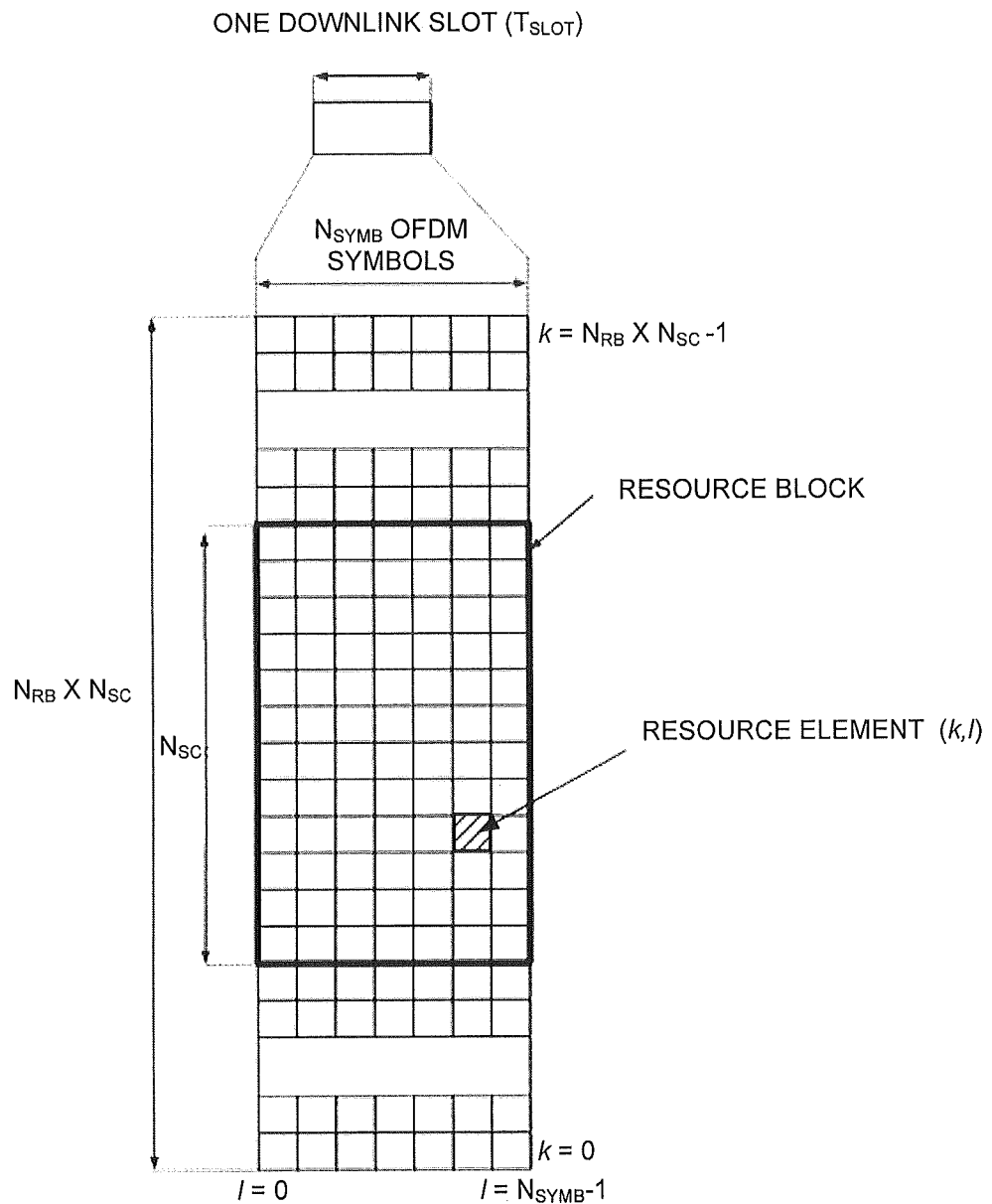
FIG. 4 illustrates a downlink resource element grid in a long term evolution (LTE) wireless communication system.

FIGS. 2-4 provide an overview of downlink processing in layer 1 in an LTE environment. Referring to FIG. 2, a transport block is received by the physical layer for transmission. The physical layer provides error detection for the transport blocks by adding Cyclic Redundancy Check (CRC) parity bits to the transport block.

The entire transport block is provided to a transport block CRC attachment block 102 which calculates the CRC parity bits. The bits in a transport block delivered to layer 1 are denoted 1 by $a_0, a_1, a_2, a_3, \ldots, a_{A-1}$, and the parity bits are denoted by $p_0, p_1, p_2, p_3, \ldots p_{L-1,m}$ where A is the size of the transport block and L is the number of parity bits.

The resulting bits, denoted by $b_0, b_1, b_2, b_3, \ldots, b_{B-1}$ where B is the number of bits in the transport block (including CRC), are input into a code block segmentation processor 104. Code block segmentation and code block CRC attachment are then performed.

After code block segmentation, the transport block bits are denoted by $c_{r0}, c_{r1}, c_{r2}, c_{r3}, \ldots, c_{r(Kr-1)}$, where r is the code block number and Kr is the number of bits for code block number r and the total number of code blocks is denoted by C. The transport bits are provided to a channel coding block 106, where each code block is individually turbo encoded.

After channel encoding the bits are denoted by $d^{(i)}_{r0}, d^{(i)}_{r1}, d^{(i)}_{r2} \ldots d^{(i)}_{r(Dr-1)}$, with i=0,1, and 2, where $D_r$ is the number of bits on the i-th coded stream for code block number r, i.e. Dr=Kr+4.

Turbo coded blocks are delivered to a rate matching block 108. They are denoted by $d^{(i)}_{r0}, d^{(i)}_{r1}, d^{(i)}_{r2} \ldots d^{(i)}_{r(Dr-1)}$, with i=0, 1, and 2, and where r is the code block number, i is the coded stream index, and Dr is the number of bits in each coded stream of code block number r. The total number of code blocks is denoted by C and each coded block is individually rate matched.

After rate matching, the bits are denoted by $e_{r0}, e_{r1}, e_{r2}, e_{r3}, \ldots, e_{rEr-1}$, where r is the coded block number, and where Er is the number of rate matched bits for code block number r.

The resulting bits are then input to a code block concatenation block 110 where code block concatenation is performed to generate code blocks $f_0, f_1, f_2, f_3, \ldots f_{G-1}$.

The present discussion relates to segmentation and encoding of code blocks from transport blocks. Code blocks are associated with the PDSCH and PMCH channels in an LTE communication system. However, some embodiments of the present inventive concepts are not limited thereto, and can be applied to the processing of data on other channels, such as the PDCCH, PCFICH, PHICH, PSS, SSS, PRS, UERS, CRS, and/or PBCH channels.

FIG. 3 illustrates physical channel processing in an LTE system. As shown therein, the physical layer (layer 1) includes multiple parallel paths 115a-115n that process codewords extracted from the code blocks. The physical channel processing first scrambles the codewords at scramblers 120a-120n prior to modulation.

The block of scrambled bits is then modulated using a modulation scheme, such as QPSK, 16QAM or 64QAM in modulation mapping processors 122a-122n, resulting in a block of complex-valued modulation symbols. The complex-valued modulation symbols for each of the code words to be transmitted are then mapped onto one or several layers by the layer mapping processor 124. The number of layers to which the modulation symbols are mapped is limited by the number of transmit antennas being used.

The mapped layers are then provided to a precoding block 126 which takes as input a block of vectors from the layer mapping and generates a block of vectors to be mapped onto resources on each of the antenna ports. Precoding may be performed for transmission on a single antenna port, for spatial multiplexing, or for transmit diversity.

The precoded layers are then passed to respective resource element mapping processors 128a-128m. For each of the antenna ports used for transmission of the physical channel, the block of complex-valued symbols is mapped in sequence to resource elements in the physical resource blocks corresponding to the virtual resource blocks assigned for PDSCH/PMCH transmission and not used for transmission of control channels, such as PCFICH, PHICH, PDCCH, PBCH, or synchronization or reference signals.

Finally, the symbols are processed by OFDM signal generators 130a-130m, which process the symbols using inverse fast fourier transform (IFFT) processing to produce orthogonal signals for transmission over antenna ports 132a-132m.

Referring to FIG. 4, the signal transmitted in each downlink time slot may be illustrated graphically as a resource grid of k subcarriers and I OFDM symbols. The subcarriers are divided into a plurality of resource blocks (RB), each of which includes $N_{SC}$ subcarriers. The number of resource blocks $N_{RB}$ transmitted in a given time slot depends on the downlink transmission bandwidth configured in the cell. A single symbol transmitted on a single subcarrier is referred to as a resource element, and is the smallest element of a time slot that can be represented.

Figure 5:
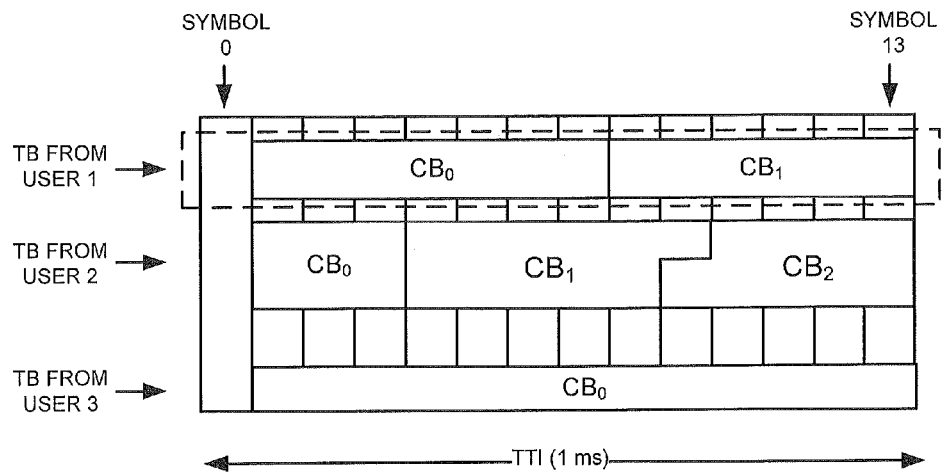
FIG. 5 illustrates encoding of a transport block into one or more code blocks.

FIG. 5 illustrates how a Transport Block (TB) is first encoded into one or many Code Blocks (using channel coding, rate matching, etc), then mapped to OFDM symbols in the resource grid. The data from a given UE is spread over two slots, or 1 Transmission Time Interval (TTI). FIG. 5 illustrates how the code blocks for UEs are spread over multiple symbols. In particular, the example shown in FIG. 5 depicts data destined for 3 UEs being mapped over one TTI.

In general, the memory requirements for downlink physical layer processing (L1) are very large. In addition, the amount of memory utilized for downlink physical layer processing grows linearly with the number of antennas in the system. Thus, to take advantage of multilayer transmission gains, memory requirements for downlink physical layer processing can become a significant cost factor.

Indeed, memory is a common limiting factor for many figures of merit in the downlink transmission system. For example, the number of UEs that may be connected to a base station, the number of radio bearers supported, etc., may all be limited by the amount of available memory.

In addition, lack of memory availability may also increase the latency of processing from L2 to the UEs. This is currently translated into capacity, in terms of the number of encoded code blocks that can be processed per millisecond.

One approach to mapping encoded code blocks to physical resources is to map all the data sent by L2 as fast as possible, triggered by the arrival of a Transport Block from L2 processing. However, this approach requires a double buffering strategy in which each buffer handles two TTIs (or 28 symbols) to pipeline the IFFT transmission of the current TTI while processing the next one.

Figure 6:
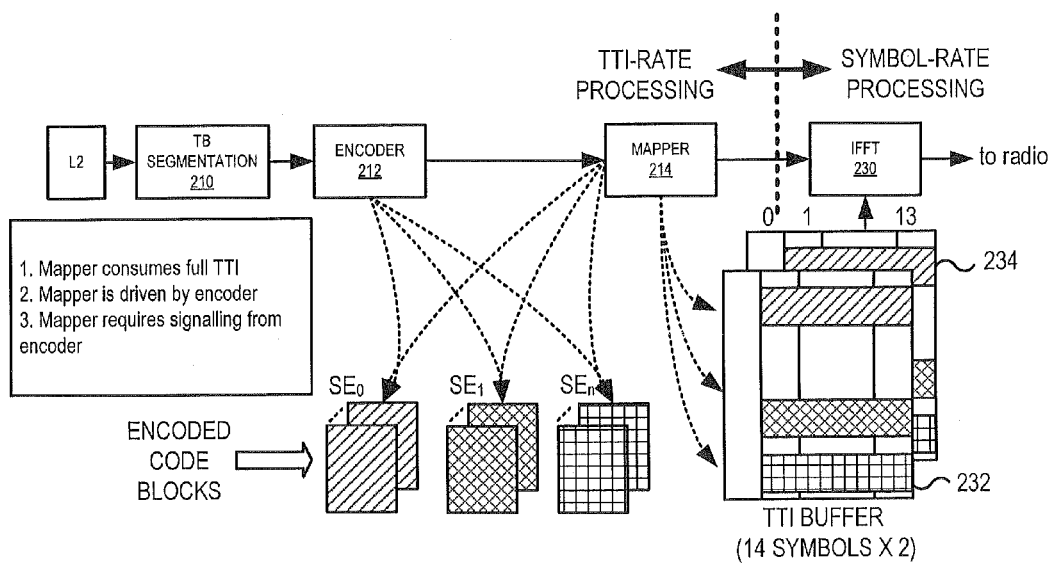
FIG. 6 is a block diagram that schematically illustrates downlink physical layer processing including portions performing TTI-rate processing and portions performing symbol-rate processing.

This approach is illustrated in FIG. 6 which schematically illustrates downlink physical layer processing performed by a transport block segmentation processor 210, an encoder 212, a mapping processor 214 and an IFFT block 230. As shown in FIG. 6, downlink physical layer processing is divided into a TTI-rate processing portion and a symbol-rate processing portion. In the embodiment of FIG. 6, TB segmentation, encoding and mapping are all performed at TTI-rate processing, while IFFT is performed at symbol-rate processing.

Referring still to FIG. 6, downlink transport blocks received from L2 processing are segmented in a TB segmentation processor 210, and then passed to an encoder 212 which generates encoded control blocks $Ecb_0, Ecb_1, \ldots Ecb_n$ for each scheduling entity SE to which data is being transmitted in the current TTI. In performing the mapping function, the mapping processor 214 waits for a full TTI worth of encoded control blocks and then consumes the entire TTI worth of encoded control blocks during the mapping operation. That is, the timing of the mapping operation performed by the mapping processor 214 is driven by the input received from the encoder 212. The mapping operation is triggered by signaling from the encoder that all code blocks for a given SE are received.

In the system of FIG. 6, the mapping processor outputs a full TTI buffer 232 of data to the IFFT processor 230, which performs an IFFT operation on the data to generate the OFDM symbols for transmission. Because the timing of the mapping operation is driven by the output of the encoder 212, a separate buffer 234 may be provided to receive the output of the next mapping operation, which significantly increases the memory requirements of the downlink physical layer processing system.

One of the reason for the large size of the resulting buffer is due to the process of modulation whereby binary information (2, 4 or 6 bits) is converted into a sample of a discrete-time waveform (32 bits).

Some embodiments provide a system which is a hybrid of TTI-rate and Symbol-rate processing to take advantage of the nature of the modulation process in the downlink physical layer processing system.

According to some embodiments, the encoding function of the physical layer processing is triggered by messages arriving from L2 over a 1 ms period (corresponding to one TTI) while the mapping portion of the physical layer processing is triggered by the symbol timing. That is, the encoding portion of the physical layer processing is input-event driven, while the mapping portion is output-event driven. In this manner the encoding process can be executed as a fast as possible, while the mapping (i.e. data expansion) portion is performed on a just-in-time basis.

Figure 7:
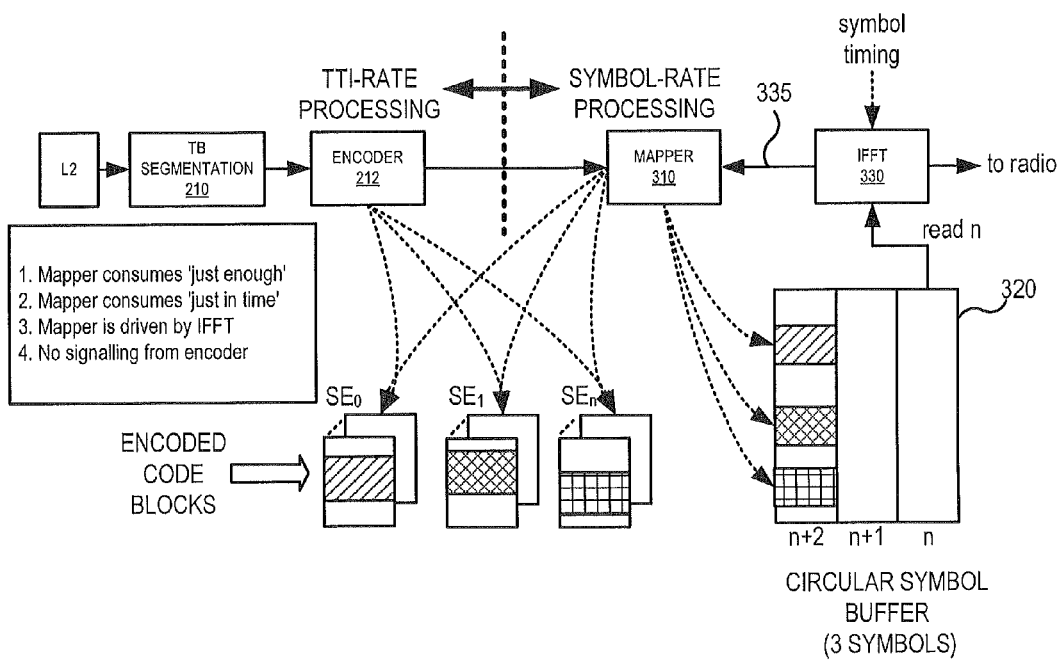
FIG. 7 is a block diagram that schematically illustrates downlink physical layer processing according to some embodiments in which the mapping processor performs symbol-rate processing.

FIG. 7 illustrates a system in which the encoding function of the physical layer processing is performed at TTI input rate, while the mapping portion of the physical layer processing is performed at a symbol output rate. The system of FIG. 7 is similar to the system of FIG. 6, except that the mapping processor 310 processes data in response to control signals provided by the IFFT processor 330, and the mapped data is input into a single circular symbol buffer 320 that holds a limited number of symbols worth of data for each subcarrier. In the example shown in FIG. 7, the circular buffer 320 is sized to hold three symbols worth of data, although the invention is not limited thereto. It will be appreciated that there may be one circular symbol buffer 320 and IFFT processor 330 per antenna port.

The encoder 212 in the system shown in FIG. 7 operates based on TTI timing in a similar manner as the encoder in the system of FIG. 7. That is, the encoder generates encoded code blocks in response to receiving segmented transport blocks from the TB segmentation block 210. The encoded code blocks are stored in a memory where they are accessible to the mapping processor 310.

Rather than waiting for enough code blocks to fill an entire TTI, the mapping processor 310 maps encoded code blocks to resource elements when instructed to do so by a control signal 335 from the IFFT processor 330. The mapping processor 310 may output symbols to the next available slot in the symbol buffer 320, while the IFFT processor 330 processes previously filled slots. In this manner, the mapping processor 310 may consume just enough data from the encoded control blocks to fill a symbol buffer for processing by the IFFT processor 330, and may provide the mapped data "just in time" for processing by the IFFT processor 330.

Accordingly, in the embodiments of FIG. 7, the operations of the mapping processor 310 are driven by symbol-based timing signals generated by the IFFT processor 330, rather than TTI-based timing signals from the encoder 212.

Figure 8:
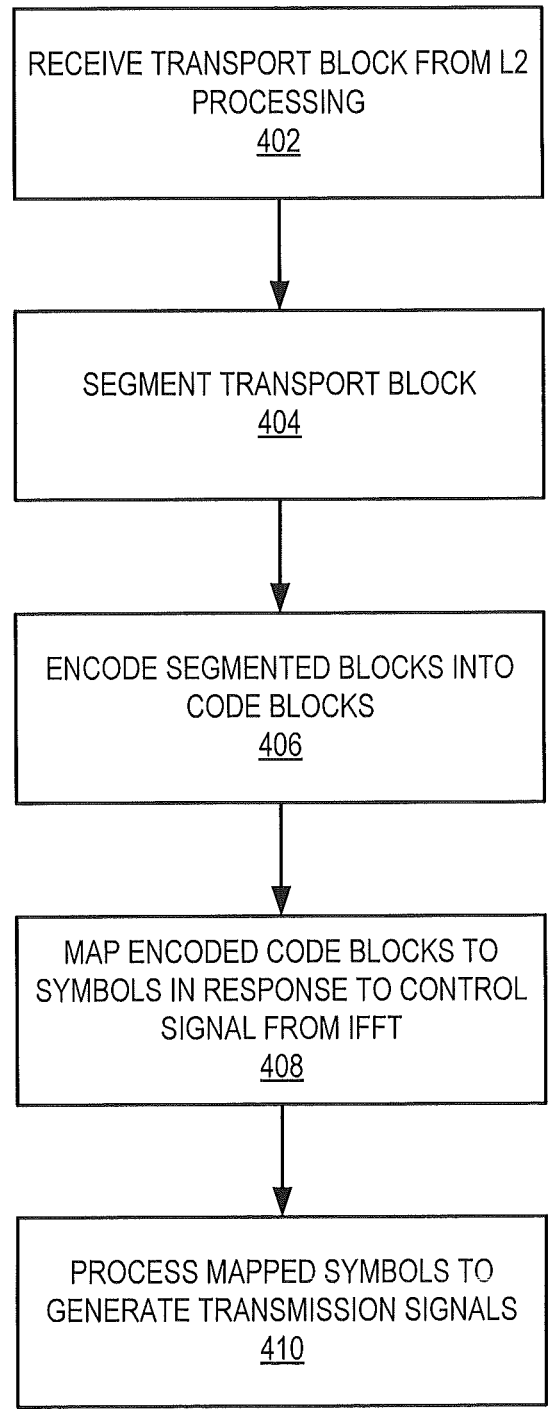
FIG. 8 is a flowchart of downlink physical layer processing systems/methods according to some embodiments.

FIG. 8 is a flowchart of operations that may be performed by downlink physical layer processing systems/methods according to some embodiments.

Referring to FIG. 8, operations begin with receipt of one or more transport blocks from the L2 processing function (block 402). The transport blocks are then segmented, for example by a TB segmentation processor 210 (FIG. 7) (block 404). Other processing may be performed on the transport blocks, such as CRC attachment, channel coding, rate matching and code block concatenation, as shown in FIG. 2.

The transport blocks are then encoded to form code blocks corresponding to the respective UEs to which data is being transmitted (block 406).

The code blocks are then mapped to physical resource elements on a symbol timing basis (block 408). For example, the code blocks may be mapped to physical resource elements in response to control signals generated by the IFFT processor 330 (FIG. 7), which may instruct the mapping processor 310 to generate a new symbol each time a symbol is consumed by the IFFT processor. The newly mapped symbol may be stored in a circular symbol buffer 320 for just-in-time retrieval by the IFFT processor 330.

The mapped symbols are then processed by the IFFT processor 330 to generate transmission signals for transmission over a transmission medium, such as an air interface (block 410).

Some embodiments may reduce antenna buffer requirements by 50-80% compared to previous approaches in which mapping is performed based on input events rather than output events. Some embodiments may further reduce CPU consumption by up to 20%.

Some embodiments may further ease implementation of 'symbol-based' features, such as antenna calibration and symbol based power boosting related to non-unary PB parameter, and/or may reduce the overall L1 latency required, which indirectly translated into end-to-end capacity, as more users can be accommodated per base station.

Although described in connection with a mobile telephone communication system, it will be appreciated that embodiments described herein can be applied to any type of communication system, including a wired communication system, a data bus, a local area network communication system, a satellite communication system, etc.

As will be appreciated by one of skill in the art, the present invention may be embodied as a method, data processing system, and/or computer program product. Accordingly, the present invention may take the form of an entirely hardware embodiment, an entirely software embodiment or an embodiment combining software and hardware aspects all generally referred to herein as a "circuit" or "module." Furthermore, the present invention may take the form of a computer program product on a tangible computer usable storage medium having computer program code embodied in the medium that can be executed by a computer. Any suitable tangible computer readable medium may be utilized including hard disks, CD ROMs, optical storage devices, or magnetic storage devices.

Some embodiments of the present invention are described herein with reference to flowchart illustrations and/or block diagrams of methods, systems and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the present invention may be written in an object oriented programming language such as Java® or C++. However, the computer program code for carrying out operations of the present invention may also be written in conventional procedural programming languages, such as the "C" programming language. The program code may execute entirely on the user's computer, partly on the user's computer, as a stand alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

What is claimed is:

1. A downlink physical layer processing system, comprising:
    a transport block segmentation processor configured to receive a transport block and to generate segmented blocks from the transport block;
    an encoder configured to encode the segmented blocks to form encoded blocks;
    a mapping processor configured to map the encoded blocks to symbols corresponding to resource elements to generate mapped symbols for transmission over a transmission medium; and
    a transmission signal generator configured to process the mapped symbols to generate transmission signals for transmission over the transmission medium;
    wherein the mapping processor is configured to map the encoded blocks to the symbols in response to a control signal generated by the transmission signal generator;
    wherein the transmission symbols comprise orthogonal frequency division multiplexing symbols; and
    wherein the mapping processor receives encoded code blocks at a rate that is based on processing of transmission time intervals by the encoder and generates symbols from the encoded code blocks at a rate that is based on a rate at which symbols are processed by the transmission symbol generator to generate the transmission symbols.

2. A downlink physical layer processing system, comprising:
    a transport block segmentation processor configured to receive a transport block and to generate segmented blocks from the transport block;
    an encoder configured to encode the segmented blocks to form encoded blocks;
    a mapping processor configured to map the encoded blocks to symbols corresponding to resource elements to generate mapped symbols for transmission over a transmission medium; and
    a transmission signal generator configured to process the mapped symbols to generate transmission signals for transmission over the transmission medium; and
    a symbol buffer configured to store a predetermined number of symbols, wherein the mapping processor is configured to store the mapped symbols in the symbol buffer, and wherein the transmission signal generator is configured to read the mapped symbols from the symbol buffer;
    wherein the mapping processor is configured to map the encoded blocks to the symbols in response to a control signal generated by the transmission signal generator; and
    wherein the mapping processor receives encoded code blocks at a rate that is based on processing of transmission time intervals by the encoder and generates symbols from the encoded code blocks at a rate that is based on a rate at which symbols are processed by the transmission symbol generator to generate the transmission symbols.

3. The downlink physical layer processing system of claim 2, wherein the symbol buffer comprises a circular buffer.

4. The downlink physical layer processing system of claim 3, wherein the circular buffer is sized to hold three symbols.

5. The downlink physical layer processing system of claim 2, wherein the transmission signal generator is configured to generate the control signal in response to processing a symbol stored in the symbol buffer.

6. The downlink physical layer processing system of claim 1, wherein the mapping processor operates independently of timing of processing of segmented blocks by the encoder.

7. A downlink physical layer processing system, comprising:
- an encoder configured to generate encoded blocks from transport blocks;
- a mapping processor configured to map the encoded blocks to symbols for transmission over a transmission medium; and
- a transmission signal generator configured to process the symbols to generate transmission signals for transmission over the transmission medium;
- wherein the encoder operates in response to timing of transmission time interval data received by the encoder and the mapping processor operates in response to timing of processing of symbols by the transmission signal generator;
- wherein the transmission symbols comprise orthogonal frequency division multiplexing symbols; and
- wherein the mapping processor receives encoded code blocks at a rate that is based on processing of transmission time intervals by the encoder and generates symbols from the encoded code blocks at a rate that is based on a rate at which symbols are processed by the transmission symbol generator to generate the transmission symbols.

8. A method of operating a downlink physical layer processing system, comprising:
- receiving a transport block;
- generating segmented blocks from the transport block;
- encoding by encoder the segmented blocks to form encoded blocks;
- mapping the encoded blocks to symbols corresponding to resource elements to generate mapped symbols for transmission over a transmission medium; and
- processing the mapped symbols to generate transmission signals for transmission over the transmission medium;
- wherein mapping the encoded blocks to the symbols is performed in response to generation of the transmission signals;
- wherein the mapped symbols comprise orthogonal frequency division multiplexing symbols; and
- wherein mapping the encoded blocks to symbols is performed at a rate that is based on a rate of processing the mapped symbols to generate transmission signals.

9. The method of claim 8, wherein processing the mapped symbols to generate transmission signals for transmission comprises performing an inverse fast fourier transform on the mapped symbols to generate orthogonal frequency division multiplexing signals.

10. The method of claim 8, further comprising storing a predetermined number of mapped symbols in a symbol buffer; and
- reading the mapped symbols from the symbol buffer prior to processing the mapped symbols to generate transmission signals for transmission.

11. The method of claim 10, wherein the symbol buffer comprises a circular buffer.

12. The method of claim 11, wherein the circular buffer is sized to hold three symbols.

13. The method of claim 10, further comprising generating the a control signal in response to processing a symbol stored in the symbol buffer; wherein mapping the encoded blocks to the symbols is performed in response to the control signal.

14. The method of claim 8, wherein mapping the encoded blocks is performed independently of timing of encoding the segmented blocks.

* * * * *